United States Patent
Forstner et al.

(10) Patent No.: US 7,672,647 B2
(45) Date of Patent: Mar. 2, 2010

(54) INTEGRATED CIRCUIT FOR TRANSMITTING AND/OR RECEIVING SIGNALS

(75) Inventors: Johan Peter Forstner, Steinhöring (DE); Herbert Jaeger, Prambachkirchen (AT)

(73) Assignee: Infineon Technologies AG, Munich (DE)

( * ) Notice: Subject to any disclaimer, the term of this patent is extended or adjusted under 35 U.S.C. 154(b) by 779 days.

(21) Appl. No.: 11/427,852

(22) Filed: Jun. 30, 2006

(65) Prior Publication Data

US 2007/0275687 A1    Nov. 29, 2007

(30) Foreign Application Priority Data

May 24, 2006    (DE)    .......... 10 2006 024 457

(51) Int. Cl.
  H04B 1/28    (2006.01)
  H04B 1/04    (2006.01)
(52) U.S. Cl. .............. 455/121; 455/333; 455/193.1
(58) Field of Classification Search .......... 455/333, 455/334, 575.7, 319, 323, 118, 121, 193.1; 343/859; 342/70; 438/752, 457, 455
See application file for complete search history.

(56) References Cited

U.S. PATENT DOCUMENTS

| | | | |
|---|---|---|---|
| 3,150,021 A | 9/1964 | Akihiko | |
| 3,577,146 A | 5/1971 | Freier et al. | |
| 3,599,197 A | 8/1971 | Boyko | |
| 4,630,003 A | 12/1986 | Torizuka et al. | |
| 5,157,356 A | 10/1992 | Wedge | |
| 5,376,902 A * | 12/1994 | Bockelman et al. ............ 333/5 |
| 5,578,970 A | 11/1996 | Nguyen et al. | |
| 5,886,591 A | 3/1999 | Jean et al. | |
| 6,054,948 A | 4/2000 | Dean | |
| 6,204,739 B1 | 3/2001 | Sakamoto et al. | |
| 6,545,550 B1 | 4/2003 | Frerking | |
| 6,756,857 B2 | 6/2004 | Aikawa et al. | |
| 7,031,689 B2 * | 4/2006 | Frank ......................... 455/333 |
| 7,119,745 B2 * | 10/2006 | Gaucher et al. ....... 343/700 MS |
| 7,215,201 B2 * | 5/2007 | Roine ......................... 330/269 |
| 7,482,972 B2 * | 1/2009 | Forstner et al. ............. 342/175 |
| 2002/0006676 A1 | 1/2002 | Debenham et al. | |
| 2005/0212090 A1 | 9/2005 | Friedrich et al. ............. 257/620 |
| 2006/0049979 A1 | 3/2006 | Miosga et al. .............. 342/175 |
| 2006/0119530 A1 | 6/2006 | Kronberger ................. 343/803 |
| 2008/0001810 A1 | 1/2008 | Forstner et al. | |

FOREIGN PATENT DOCUMENTS

DE    69423684 T2    11/2000

(Continued)

OTHER PUBLICATIONS

Haydl et al. "Single-Chip Coplanar 94-GHz FMCW Radar Sensors" IEEE Microwave and Guided Wave Letters, vol. 9, No. 2 (pp. 73-75), Feb. 1999.

(Continued)

Primary Examiner—Sonny Trinh
(74) Attorney, Agent, or Firm—Eschweiler & Associates, LLC (57) ABSTRACT

An integrated circuit for transmitting and/or receiving signals includes a differential antenna terminal for coupling to an antenna, a processing circuit for processing differential signals, and first differential lines coupling the differential antenna terminal to a differential input and/or output of the processing circuit.

24 Claims, 4 Drawing Sheets

FOREIGN PATENT DOCUMENTS

| | | |
|---|---|---|
| DE | 10026227 A1 | 12/2001 |
| DE | 102004014644 A1 | 10/2005 |
| DE | 102004027839 A1 | 1/2006 |
| EP | 1024590 A1 | 8/2000 |
| EP | 1231825 A1 | 8/2002 |
| WO | 98/16848 A1 | 4/1998 |
| WO | 03/100456 A1 | 12/2003 |

OTHER PUBLICATIONS

U.S. Appl. No. 11/427,847, filed Jun. 30, 2006 entitled "Apparatus and Methods for Performing a Test", Jun. 30, 2006.

U.S. Appl. No. 11/427,858, filed Jun. 30, 2006 entitled "Integrated Multi-Mixer Circuit", Jun. 30, 2006.

Okazaki et al. Wide-band SSB subharmonically pumped mixer MMIC, Okazaki, H.; Yamaguchi, Y.; Microwave Theory and Techniques, IEEE Transactions on vol. 45, Issue 12, Part 2, Dec. 1997 pp. 1035-1038.

Srikanth et al. Radio-Frequency impedance measurements using a tunnel-diode oscillator technique, Jul. 1999, Review of Sientific Instruments, vol. 70, No. 7.

Non-Final Office Action dated Jun. 3, 2008 for U.S. Appl. No. 11/427,847.

Non-Final Office Action dated Sep. 9, 2009 for U.S. Appl. No. 12/337,353.

Non-Final Office Action dated Apr. 3, 2008 for U.S. Appl. No. 11/427,858.

Notice of Allowance dated Oct. 16, 2008 for U.S. Appl. No. 11/427,847.

Notice of Allowance dated Sep. 25, 2008 for U.S. Appl. No. 11/427,858.

* cited by examiner

INTEGRATED CIRCUIT FOR TRANSMITTING AND/OR RECEIVING SIGNALS

PRIORITY

This application claims priority from German Patent Application No. 10 2006 024 457.5, which was filed on May 24, 2006, and is incorporated herein by reference in its entirety.

TECHNICAL FIELD

The present invention relates to an integrated circuit for transmitting and/or receiving signals having a differential antenna terminal for coupling to an antenna, as may, for example, be employed in motor vehicle radars.

BACKGROUND

There is a continuous increase in the number of radio-frequency applications, such as, for example, in motor vehicle radar technology. Low costs of the devices and integrated circuits are a prerequisite for the wide spreading of applications of this type. Thus, hybrid setups having high operating and compensating complexity, as have traditionally been used in radio-frequency technology, are ruled out from being used in mass applications. However, an integration of as many radio-frequency functions as possible and a good and cheap setup technology are necessary. Depending on the frequency band and the application, the integration of the circuits is possible in different semiconductor technologies. Candidates are both silicon technologies (Si technologies) and also III-V semiconductor technologies. Frequency bands at 5.8 GHz, 10.5 GHz, 24 GHz, 48 GHz and 77 GHz are, for example, employed for anti-collision systems in motor vehicle technology.

In applications in the mm wavelength range, bond wires are often used to electrically connect radio-frequency signals from an MMIC (monolithic microwave integrated circuit) to a printed circuit board. Thus, a bond wire is a connective wire connecting the terminals on the chip visible from outside (so-called chip pads) to a substrate. However, in the 77 GHz band for motor vehicle radar applications for example, bond wires are considered as critical both with regard to manufacturing and their electrical characteristics. To obtain reproducible characteristics, very narrow manufacturing tolerances must be kept to. In addition, bond connections of this kind are lossy.

Well-known systems for the mm wavelength range are based on an unbalanced routing on a printed circuit board. The transition to the MMIC is made either by bond wires or by so-called flip-chip mounting of the chip where no wire connections are necessary. However, increased thermal problems arise due to the poorer heat dissipation. Another well-known approach is using so-called "hot vias" which are particularly used in GaAs semiconductor technologies. Here, the chip front side is contacted to the back side using through contactings. The contact to the printed circuit board is made via a patterned back side. This, in turn, entails increased manufacturing costs and the usage thereof is prohibitive in conducting semiconductor substrates (such as, for example, 18.5 ohm cm silicon).

An approach, up to now not realized in motor vehicle radar systems, of integrating mixers into the system is using continually differential architecture in connection with differential antennas. Up to now, integrated circuits based on GaAs technologies have been used. Thus, the lines and transitions from the printed circuit board to a semiconductor chip have mostly been made in an unbalanced manner. With these architectures, bond wires connected to the ground potential conduct radio-frequency signals. This results in undesired interferences in the integrated circuits. In addition, a mode conversion from unbalanced to balanced signal routing within the chip may be necessary, which is a lossy operation.

SUMMARY

In one embodiments an integrated circuit for transmitting and/or receiving signals comprises a differential antenna terminal for coupling to an antenna, a processing circuit for processing differential signals, and differential lines coupling the differential antenna terminal to a differential input and/or output of the processing circuit.

Thus, embodiments of the invention comprise the advantage that using a differential antenna terminal on an integrated circuit coupled to a differential input and/or output of a processing circuit of the integrated circuit via differential lines, a transition of an antenna signal to the integrated circuit may take place in a differential manner. Thus, transition losses may be reduced. Furthermore, the influence of manufacturing tolerances can be minimized. Another advantage is that fewer mode conversions from unbalanced to balanced signal routing have to be performed on the chip. Additionally, cross-talk of neighboring signals is reduced considerably by the differential signal routing.

BRIEF DESCRIPTION OF THE DRAWINGS

Preferred embodiments of the present invention will be detailed subsequently referring to the appended drawings, in which.

DETAILED DESCRIPTION

Figure 1:
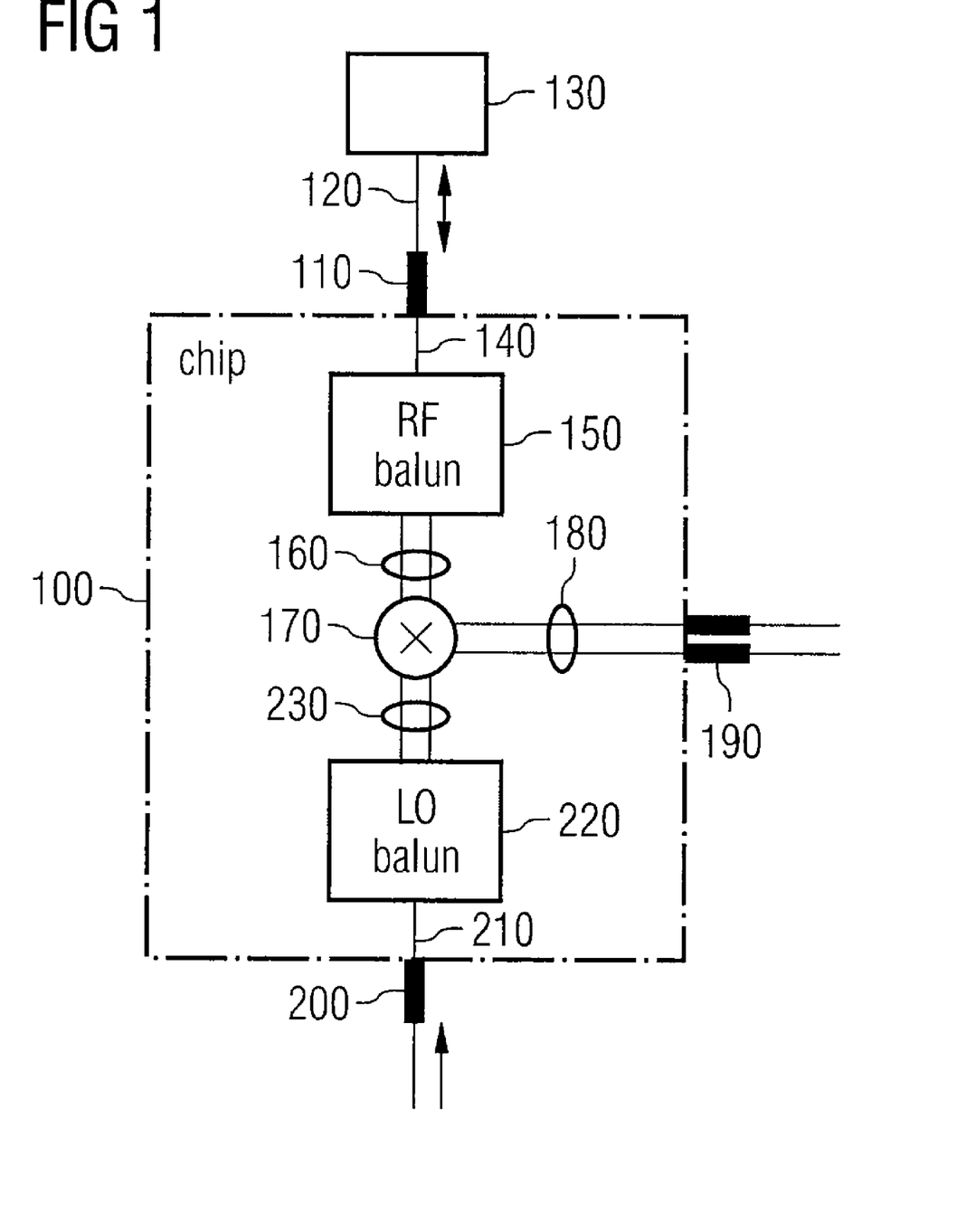
FIG. 1 is a basic illustration of a mixer MMIC in connection with a patch antenna fed in an unbalanced manner.

Well-known systems for the mm wavelength range are based on unbalanced routing on a printed circuit board. Such a system is exemplarily shown in FIG. 1. FIG. 1 shows a basic illustration of a radar receive mixer comprising a mixer MMIC wired in an unbalanced or single ended manner, in connection with a patch antenna fed in an unbalanced manner.

FIG. 1 shows a semiconductor chip 100 arranged on a printed circuit board (not shown). The chip 100 comprises an external unbalanced antenna terminal 110 for electrical signals routed in an unbalanced manner, which outside the chip 100 is connected to a patch antenna 130 fed in an unbalanced manner via a line 120. Here, external terminal means such a terminal which can be accessed from outside the chip 100 to allow the chip 100 to be connected to external components.

The antenna terminal 110 is connected to an unbalanced terminal of an RF balance converter 150 (RF balun) via a line 140. A balanced terminal of the balance converter 150 is connected to a first differential input terminal of a differential mixer 170 via a line pair 160. A differential output terminal of the differential mixer 170 is connected to an external differential output terminal 190 of the semiconductor chip 100, which may be referred to as IF output or LF output, via a line pair 180. The differential output terminal is then connected to an evaluation circuit (not shown).

An external unbalanced local oscillator terminal 200 of the semiconductor chip 100 is connected to an unbalanced terminal of a second balance converter 220 (LO balun) via a line 210. A balanced terminal of the second balance converter 220 is coupled to a second input terminal of the differential mixer 170 via a line pair 230.

In operation, a local oscillator signal (LO input) having a frequency of, for example, 77 GHz is received at the local oscillator terminal 200. An antenna signal is received or transmitted at the antenna terminal 110. The antenna terminal thus is an input/output terminal, wherein for transmitting the antenna terminal may be coupled to a transmit signal via suitable coupling means (not shown), such as, for example, via the local oscillator terminal. The antenna signal may thus also have a frequency in the range of 77 GHz. The mixer 170 mixes the signals received at the differential inputs thereof and outputs a low-frequency output signal at the differential output having a frequency corresponding to the difference of the frequencies of the signals received at the antenna terminal 110 and at the local oscillator terminal 210.

The radar receive mixer illustrated in FIG. 1 is based on unbalanced routing on the printed circuit board on which the chip 100 is arranged, and at the transition from the printed circuit board to the chip 100.

The architecture according to FIG. 1 is of disadvantage in that a mode conversion from unbalanced to balanced signal routing within the chip 100 by the balance converters 150, 220 is necessary, which is lossy and impairs the mixer noise factor and the conversion gain.

According to different embodiments, differential terminals on an integrated circuit or chip are used to implement signal transitions to an antenna. This allows using differential antennas in connection with a differential routing to differential processing circuits, i.e. on-chip circuit architectures, as are, for example, employed in Si/SiGe radar high-speed circuits. Thus, mode-converting circuit blocks (balance converters) on the integrated circuit may be omitted so that on-chip losses can be reduced or minimized.

Embodiments are based on a way, not taken so far, of integrating mixers into a system in motor vehicle radar systems by using a continually differential architecture in connection with differential antennas. Here, the transition losses can be reduced and the influence of manufacturing tolerances can be minimized by using differential transitions. Furthermore, no mode conversion (unbalanced to balanced) has to be performed on the integrated circuit, i.e. the chip, which is also a lossy process and impairs the mixer noise factor and the conversion gain.

According to embodiments, an integrated circuit comprises a differential antenna terminal on the circuit substrate for coupling to an antenna and/or differential oscillator terminals on the circuit substrate for coupling to a differential output of an oscillator circuit, a processing circuit on the circuit substrate for processing differential signals, and differential lines on the circuit substrate coupling the differential antenna terminal and/or the differential oscillator terminal to a differential input and/or output of the processing circuit, the integrated circuit being applied onto a semiconductor substrate.

According to embodiments, a radar circuit comprises an oscillator having a differential output terminal, an antenna having a differential terminal, and an integrated circuit having a differential oscillator terminal coupled to the differential output terminal of the oscillator, a differential antenna terminal coupled to the terminal of the antenna, a processing circuit having a first differential input and a second differential input, and first differential lines coupling the antenna terminal to the first differential input, and second differential lines coupling the differential oscillator terminal to the second differential input.

According to embodiments, a method for operating an integrated circuit comprises a step of transferring an antenna signal between a differential input and/or output of a processing circuit of the integrated circuit and a differential antenna terminal of an antenna exclusively via differential signal routing.

According to embodiments a method for operating an integrated circuit comprises a step of transferring a differential oscillator signal between a differential output of an oscillator and a differential input of a processing circuit of the integrated circuit exclusively via differential signal routing.

Embodiments have a continually differential design so that the advantages with regard to low susceptibility towards manufacturing tolerances and with regard to small losses can be obtained comprehensively.

Embodiments are configured to operate with radio-frequency signals of a frequency of more than 1 GHz, preferably more than 20 GHz and even more preferably of more than 70 GHz. Embodiments are configured for radar applications to exemplarily operate in a frequency band at 5.8 GHz, at 10.5 GHz, at 24 GHz, at 48 GHz or at 77 GHz. In embodiments, the integrated circuits are radar circuits or motor vehicle front end circuits. Exemplarily, the integrated circuits may comprise elements or components produced by Si/SiGe technology process steps.

Figure 2:
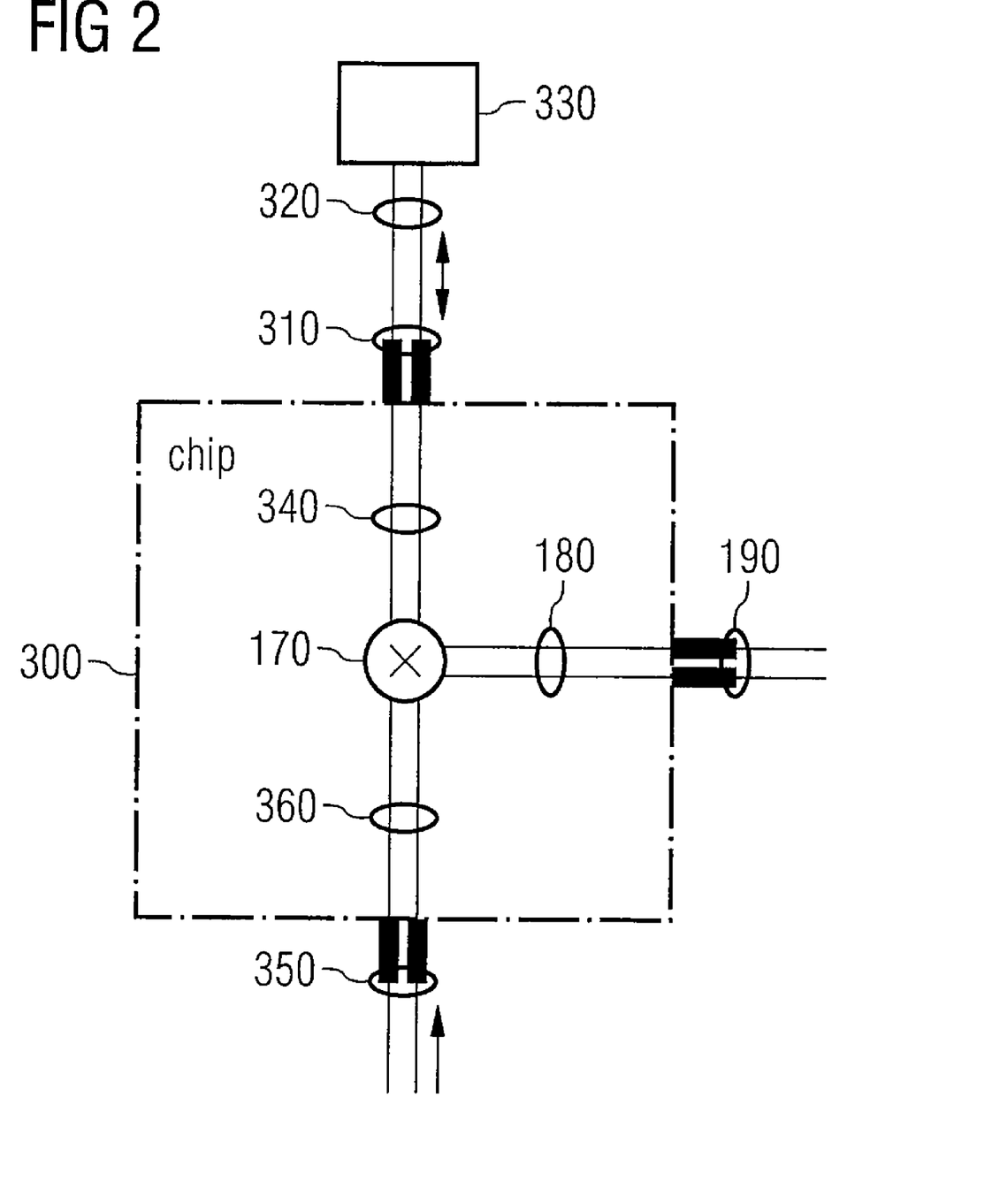
FIG. 2 is a schematic illustration of a differential mixer MMIC in connection with a differential patch antenna.

FIG. 2 shows a semiconductor chip 300 comprising an external differential antenna terminal 310 for differentially conducted electrical signals connected to a differentially fed patch antenna 330 via a differential line pair 320. Furthermore, the differential antenna terminal 310 in the chip 300 is connected to a first differential input of a differential mixer 170 via first differential lines 340. In addition, an output of the mixer 170 is connected to an external differential output terminal 190 of the semiconductor chip 300 via differential lines 180. Furthermore, the semiconductor chip 300 comprises an external differential local oscillator terminal 350 which in the chip 300 is connected to a second differential input of the mixer 170 via second differential lines 360.

The semiconductor chip 300 is arranged on a printed circuit board (not shown) on which additionally the antenna (330) connected to the antenna terminal (310), a local oscillator coupled to the local oscillator terminal (not shown), and/or an evaluating circuit coupled to the output terminal (not shown) may be arranged. The signal routing on the printed circuit board takes place in a differential manner. In addition, the signal transitions from the printed circuit board to the chip 300 take place in a differential manner.

The local oscillator may, for example, be in the form of a VCO (voltage controlled oscillator) or a DRO (dielectric resonance oscillator).

The circuit shown in FIG. 2 may, like the circuit described above, be used as a radar receive mixer and, in particular, as a motor vehicle radar receive mixer.

In operation, an antenna signal, exemplarily in the range of a frequency of 77 GHz, is received at the terminal 310 from the antenna 330, whereas a local oscillator signal from the local oscillator, exemplarily at a frequency of 77 GHz, is received at the local oscillator terminal 350. The signals received are mixed by the mixer 170 and a low-frequency output signal having a frequency corresponding to the difference of the frequencies of the signals at the inputs of the mixer 170 is output at the output terminal 190. The low-frequency output signal is then fed to the evaluating circuit.

The antenna terminal 310 may be an input/output terminal via which signals are both received from and output to the antenna 330. In FIG. 2, only the circuit structure required for the receive signal is illustrated, whereas optional components for applying a transmit signal to the antenna terminal 310, such as, for example, a directional coupler, via which the antenna terminal can be coupled to the local oscillator terminal are not illustrated.

The circuit is based on a completely balanced, i.e. differential routing on a printed circuit board and within the semiconductor chip 300, the substrate of which may be a silicon substrate and the circuit components of which may be produced by radio-frequency-capable processes, in particular an Si/SiGe process. The Si/SiGe technology is made on a silicon wafer. Exemplarily, with such a technology, the basis of bipolar transistors is doped with germanium when manufacturing the integrated circuit in order for the transistors to be able to transmit higher frequencies, in particular frequencies greater than 10 GHz. The individual process steps for manufacturing Si/SiGe bipolar transistors on a silicon substrate are known to a person skilled in the art and will thus not be discussed in greater detail.

In this application, a differential terminal means a terminal having a pair of two terminal poles. The distance between the terminal poles of a respective terminal pole pair may be smaller than 1000 μm, preferably smaller than 100 μm and even more preferably smaller than 50 μm. Connections between the terminal poles and respective terminal structures on the printed circuit board may, exemplarily, be formed by bond wires. The differential lines of the lines pairs 180, 340, 360 may each have a mutual distance of less than 1000 μm, preferably less than 100 μm and even more preferably less than 10 μm and may be arranged with regard to one another such that they have a predetermined characteristic impedance (exemplarily 50 ohm).

Figure 3:
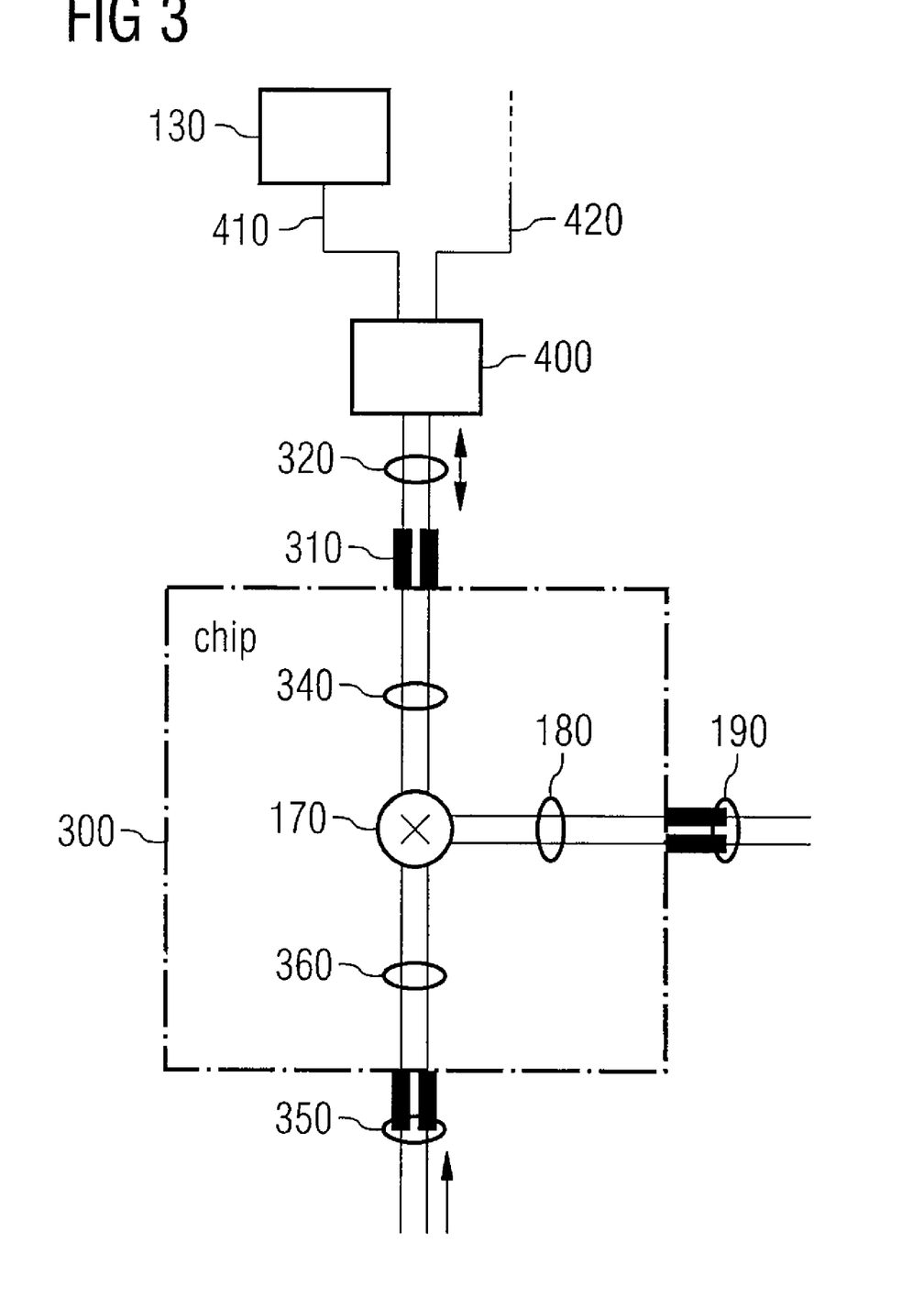
FIG. 3 is a schematic illustration of a differential mixer MMIC in connection with a patch antenna fed in an unbalanced manner.

FIG. 3 shows another embodiment where the semiconductor chip 300 already described with regard to FIG. 2 is connected to an input of a 180° power divider 400 (or 180° balun) via the differential antenna terminal 310 and the differential line 320. A first unbalanced output of the 180° power divider is coupled to a patch antenna 130 fed in an unbalanced manner via a line 410. A second unbalanced output of the 180° power divider 400 may be coupled to other circuit components (not shown), such as, for example, to another patch antenna fed in an unbalanced manner.

It is to be pointed out that in further embodiments a processing circuit integrated on the chip 300 may, in addition to or instead of the mixer 170 illustrated in FIGS. 2 and 3, also contain other circuit components for processing differential signals.

Figure 4:
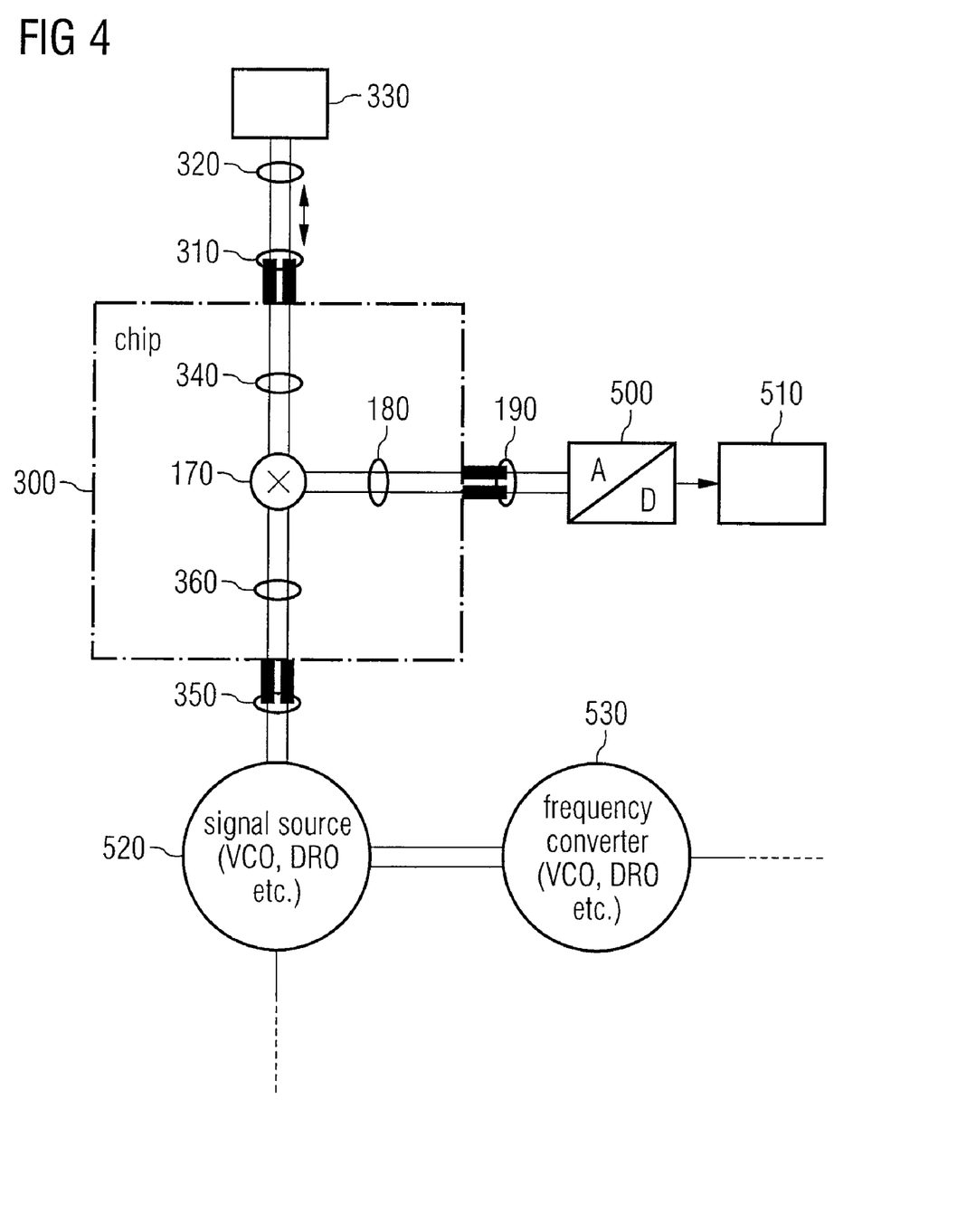
FIG. 4 is a schematic illustration of a differential radar system comprising mixer, signal source and frequency converter.

FIG. 4 shows a schematic illustration of an differential radar system having mixer, signal source and frequency converter.

FIG. 4 shows a differential FMCW (FMCW=frequency modulated continuous wave) radar system as another embodiment, only a receive path being illustrated. A semiconductor chip 300 already described referring to FIG. 2 is connected to an antenna 330 via a differential antenna terminal 310 and a differential line 320. A differential terminal 190 of the semiconductor chip 300 is connected to an analog input of an AD (analog/digital) converter 500, the digital output of which is coupled to a signal processing block 510. A differential local oscillator terminal 350 of the semiconductor chip 300 is connected to a signal source 520 via differential lines which in turn is connected to a frequency converter 530 via differential lines.

In an FMCW radar system of which only a receive path is shown in FIG. 4, a linearly frequency-modulated radio-frequency signal is used, i.e. a transmitting frequency exemplarily increases linearly in a time interval (frequency sweep). Since in FMCW radar systems transmitting and receiving may be performed simultaneously, a transmitting/receiving separation unit, such as, for example, a circulator, a hybrid, a coupler or two antennas, is typically required. Such a transmitting/receiving separation unit is not shown in FIG. 4 for reasons of clarity. The linearly frequency-modulated radio-frequency signal may exemplarily be produced by the signal source 520 and the frequency converter 530 functioning as parts of a PLL (phase locked loop). A reference frequency at an input of the PLL (not shown) which may be orders of magnitude lower than the radar frequency generated by the signal source 520 controlled by the PLL is exemplarily already linearly frequency-modulated by a DDS (direct digital synthesizer). In the meantime the transmitting frequency changes by a delay time during signal propagating to a reflector so that a low-frequency signal (typically up to several kHz) is obtained at the output 190 by the mixer 170 from the difference of the current transmitting frequency at the input 350 and the receiving frequency at the antenna input 310. The frequency thereof is proportional to a reflector distance. In FMCW radar systems, a delay time is thus converted to a frequency. If the frequency sweep is linear, the frequency of the low-frequency mix signal will remain constant during the sweep process. Due to the low resulting signal frequencies, further signal processing in block 510 is, as far as technology is concerned, possible in a relatively simple and very precise manner. Usually, evaluation takes place by means of digital signal processing.

In another embodiment, a signal source comprising a differential output coupled to the differential input of the signal processing means which may be formed by a mixer may exemplarily be provided on the chip. Thus, the signal source may, exemplarily, be a voltage-controlled oscillator (VCO) or a dielectric resonance oscillator (DRO). In contrast to the embodiments shown in FIGS. 2 and 3, the mixer and the signal source here are integrated together on the chip.

Alternatively, the signal source may be a circuit processing an oscillator signal received. The signal source may thus comprise a differential input coupled to the local oscillator terminal via differential lines.

In another embodiment, the chip may comprise a processing circuit having a mixer having a first differential input and a second differential input, a signal source having a first and a second differential output, and a frequency converter having a differential input and a differential output, the first differential input of the mixer being coupled to the differential antenna terminal via differential lines, the second differential input of the mixer being coupled to the first differential output of the signal source via differential lines and the differential input of the frequency converter being coupled to the second differential output of the signal source.

The completely differential architecture of one embodiment described is based on the approach of evaluating the difference between two signals instead of evaluating the absolute value of a signal or a threshold or reference potential. The way via the difference between two signals exemplarily offers a possibility of being able to differentiate a logically high signal from a logically low signal even with extremely noisy values.

Interferences in a system usually influence signals in the common mode. Since, in a common mode interference, the interference has the same effects on all the signals, a differential signal may still be recognized without problems. It may, for example, be determined from the sign of the difference whether the signal is a low or high signal.

The ground potential very often is the cause for interferences. All the components in a system are connected to the ground potential. If an interference on the ground potential is caused by a component of a system, this interference will have an effect on other components of the system in an unbalanced architecture, i.e. the isolation between the individual components is limited. With a purely differential architecture, such interferences of the ground potential are irrelevant. The increased noise ratio, together with the common mode rejection of differential architectures provides for differential architectures to also exhibit an excellent performance in surroundings with interferences. The differential signal transmission thus can do with extremely small voltage changes. With equal edge steepness, the operating frequency possible for a differential signal is considerably higher than that of unbalanced circuits because the voltage swing required for transmitting a valid signal is very much smaller.

Another advantage of the differential architecture is the fact that the two differential signals are based on currents having the same quantity but being complements. If the currents have the same quantity and are complements, the same will also apply to their magnetic fields. As long as the traces are close to one another, the portions of the magnetic fields largely cancel out one another, which reduces interfering radiation.

When comparing the embodiment illustrated in FIG. 2 to the circuit shown in FIG. 1, it becomes obvious that the two baluns 150, 220 are omitted due to the differential signal routing on the chip 300. The isolation conditions with regard to ground are transformed by baluns (balanced/unbalanced). When there are no more baluns 150, 220, the mixer noise factor is reduced by about 1 to 2 dB with a frequency of f=77 GHz as a consequence of reduced losses. Due to employing the differential bonds 310, 350, an additional improvement in the mixer noise factor results as a consequence of reduced transition losses of signals outside the chip 300 into the chip 300.

Existing radar receive mixers, as are shown in FIG. 1, mostly rely on GaAs technology. Due to the low price of silicon and the bigger monocrystals thereof, allowing more chips to be produced in one pass, and the possibility of producing insulating regions more easily in silicon than is possible in GaAs, realization of the above radar receive mixer in an Si/SiGe technology is of advantage. Accordingly, in one embodiment, the circuit substrate is based on an Si/SiGe technology.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An integrated circuit for transmitting and/or receiving signals, comprising:
   a differential antenna terminal for coupling to an antenna;
   a processing circuit for processing differential signals;
   first differential lines coupling the differential antenna terminal to a differential input and/or output of the processing circuit;
   a differential oscillator terminal for coupling to a differential output of an oscillator; and
   second differential lines coupling the differential oscillator terminal to a differential input and/or output of the processing circuit.

2. The integrated circuit according to claim 1, wherein the differential antenna terminal and/or the differential oscillator terminal each comprise a pair of terminal poles.

3. The integrated circuit according to claim 1, wherein the integrated circuit is applied to a semiconductor substrate.

4. The integrated circuit according to claim 3, wherein the semiconductor substrate is a silicon substrate.

5. The integrated circuit according to claim 4, wherein the integrated circuit comprises circuit elements having been produced by an Si/SiGe process.

6. The integrated circuit according to claim 1, wherein the signals comprise a frequency of more than 1 GHz, preferably more than 20 GHz and even more preferably more than 70 GHz.

7. The integrated circuit according to claim 1, wherein the processing circuit comprises a mixer comprising a first differential input and a second differential input, the first input being coupled to the differential antenna terminal via the first differential lines and the second input being coupled to a or the differential oscillator terminal via the second differential lines.

8. The integrated circuit according to claim 7, further comprising a differential output terminal, the mixer comprising a differential output coupled to the differential output terminal via the second differential lines.

9. The integrated circuit according to claim 1, wherein the processing circuit comprises a mixer comprising a first differential input and a second differential input and a signal source comprising a differential output, the first differential input of the mixer being coupled to the differential antenna terminal via the first differential lines and the second differential input of the mixer being coupled to the differential output of the signal source via the second differential lines.

10. The integrated circuit according to claim 9, wherein the signal source is a first voltage-controlled oscillator (VCO) or a first dielectric resonance oscillator (DRO).

11. The integrated circuit according to claim 9, wherein the processing circuit comprises a frequency converter comprising a differential input and a differential output, the signal source comprising a first and a second differential outputs, the differential input of the frequency converter being coupled to the second differential output of the signal source.

12. The integrated circuit according to claim 1, wherein all the signal paths comprise differential lines.

13. The integrated circuit according to claim 1, wherein the differential antenna terminal and/or the differential oscillator terminal comprise a pair of terminal poles each comprising a distance of less than 1000 micrometers, preferably less than 100 micrometers and even more preferably less than 50 micrometers.

14. The integrated circuit according to claim 1, wherein the differential lines comprise a mutual distance of less than 1000 micrometers, preferably less than 100 micrometers and even more preferably less than 10 micrometers.

15. The integrated circuit according to claim 1, wherein the differential lines comprise an arrangement with respect to one another comprising a predetermined characteristic impedance.

16. The integrated circuit according to claim 1, wherein the antenna is a differential antenna.

17. The integrated circuit according to claim 1, wherein the oscillator is a local oscillator (LO).

18. An integrated circuit for transmitting and/or receiving signals, comprising:
- a differential antenna terminal for coupling to an antenna;
- a processing circuit for processing differential signals;
- first differential lines coupling the differential antenna terminal to a differential input and/or output of the processing circuit, wherein the antenna comprises a one-component antenna element coupled to the differential antenna terminal via a power divider, the power divider comprising a 180° power divider.

19. An integrated circuit comprising:
- a differential antenna terminal for coupling to an antenna and/or differential oscillator terminals for coupling to a differential output of an oscillator circuit;
- a processing circuit for processing differential signals; and
- first and second differential lines coupling the differential antenna terminal and/or the differential oscillator terminal to a differential input and/or output of the processing circuit, the integrated circuit being integrated on a semiconductor substrate,
- wherein the processing circuit comprises a mixer comprising a first differential input and a second differential input, the first differential input being coupled to the differential antenna terminal via the first differential lines and the second differential input being coupled to the differential oscillator terminal via the second differential lines.

20. The integrated circuit according to claim 19, wherein the circuit comprises circuit elements produced by Si/SiGe technology process steps.

21. The integrated circuit according to claim 19, to be used for radio-frequency signals comprising a frequency of more than 1 GHz, preferably more than 20 GHz and even more preferably more than 70 GHz.

22. The integrated circuit according to claim 19, further comprising a differential output terminal, the mixer comprising a differential output coupled to the differential output terminal via third differential lines.

23. The integrated circuit according to claim 19, wherein all the signal paths comprise differential lines.

24. A radar circuit comprising:
- an oscillator comprising a differential output terminal;
- an antenna comprising a differential terminal; and
- an integrated circuit comprising:
  - a differential oscillator terminal coupled to the differential output terminal of the oscillator;
  - a differential antenna terminal coupled to the terminal of the antenna;
  - a processing circuit comprising a first differential input and a second differential input; and
  - first differential lines coupling the antenna terminal to the first differential input, and second differential lines coupling the differential oscillator terminal to the second differential input.

* * * * *